United States Patent
Ishihara

(10) Patent No.: US 7,594,955 B2
(45) Date of Patent: Sep. 29, 2009

(54) PROCESS FOR RECOVERING RARE GASES USING GAS-RECOVERING CONTAINER

(75) Inventor: Yoshio Ishihara, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 414 days.

(21) Appl. No.: 11/114,169

(22) Filed: Apr. 26, 2005

(65) Prior Publication Data

US 2005/0235828 A1  Oct. 27, 2005

(30) Foreign Application Priority Data

Apr. 27, 2004 (JP) ............................ 2004-130704
Mar. 23, 2005 (JP) ............................ 2005-082991

(51) Int. Cl.
*B01D 53/02* (2006.01)
*C01B 23/00* (2006.01)

(52) U.S. Cl. ............................................ 95/95; 95/127

(58) Field of Classification Search .................. 95/127, 95/95

See application file for complete search history.

(56) References Cited

U.S. PATENT DOCUMENTS

| | | | | |
|---|---|---|---|---|
| 2,793,507 A | * | 5/1957 | Hnilicka | 95/106 |
| 3,922,150 A | * | 11/1975 | Yusa et al. | 95/96 |
| 4,054,427 A | * | 10/1977 | Schroeter et al. | 95/97 |
| 4,562,000 A | * | 12/1985 | Ringel | 423/210 |
| 4,816,041 A | * | 3/1989 | Ringel et al. | 95/127 |
| 5,032,152 A | * | 7/1991 | Vansant et al. | 95/95 |
| 5,186,007 A | * | 2/1993 | Takano et al. | 62/656 |
| 6,658,894 B2 | * | 12/2003 | Golden et al. | 62/652 |
| 6,848,269 B2 | * | 2/2005 | Higginbotham et al. | 62/648 |
| 2003/0000385 A1 | * | 1/2003 | Kawai et al. | 95/96 |
| 2004/0216609 A1 | * | 11/2004 | Baksh et al. | 95/8 |
| 2005/0199122 A1 | * | 9/2005 | Urakami et al. | 95/96 |
| 2005/0235831 A1 | * | 10/2005 | Taveira et al. | 96/111 |

FOREIGN PATENT DOCUMENTS

| | | | |
|---|---|---|---|
| JP | 2001-270708 A | * | 10/2001 |
| JP | 2002-97007 | | 4/2002 |
| WO | WO 81/00413 | * | 2/1981 |

* cited by examiner

*Primary Examiner*—Frank M Lawrence
(74) *Attorney, Agent, or Firm*—Edwards Angell Palmer & Dodge LLP

(57) ABSTRACT

A process for recovering rare gases using a gas-recovering container and, more particularly, a process of recovering a rare gas in a rare gas-containing exhaust gas discharged from an equipment using said rare gas, and introducing the recovered rare gas-containing exhaust gas into rare gas separation and purifying equipment and therein separating and purifying the rare gas.

3 Claims, 2 Drawing Sheets

PROCESS FOR RECOVERING RARE GASES USING GAS-RECOVERING CONTAINER

BACKGROUND OF THE INVENTION

1. Field of the Invention

The present invention relates to a process for recovering rare gases using a gas-recovering container and, more particularly, relates to a process of recovering a rare gas in a rare gas-containing exhaust gas discharged from an equipment using said rare gas, and introducing the recovered rare gas-containing exhaust gas into rare gas separation and purifying equipment and therein separating and purifying the rare gas.

The rare gas in the present invention is krypton or xenon, or a mixed gas thereof.

2. Description of the Related Art

In processes for producing semiconductor integrated circuits, liquid crystal panels, solar batteries and panels thereof, and semiconductor products such as magnetic disks and the like, apparatuses capable of generating plasma in an atmosphere of an inert gas and carrying out various treatments of semiconductor products by the plasma have been widely used.

Conventionally, in these treatments, argon gas has been used as an inert gas. Recently, krypton or xenon has been used as an inert gas for carrying out more sophisticated treatments (hereinafter, the term of rare gas in the present specification indicates krypton and xenon). Krypton and xenon are very expensive gases because of their present proportion in the atmosphere and complicated separation processes. In order to economically perform the processes using such valuable gases, it is essential to recover used krypton or xenon at a high recovery rate, separate and purify it, and submit to circulating use thereof. Further, krypton or xenon obtained after recovering, separation and purification thereof is used in a highly-purified state such that it has an impurity concentration of not more than 100 ppm.

Exhaust gas containing a rare gas (krypton and xenon) mainly comprises the rare gas and either nitrogen or argon, wherein the rare gas is a subject for separation and purification. Exhaust gas caused by plasma oxidation further comprises several % of oxygen in addition to the above-described gases. Furthermore, exhaust gas caused by plasma CVD comprises metal hydride type gases. Moreover, exhaust gas sometimes contains slight amounts of impurities and, as a reaction by-product, moisture, carbon monoxide, carbon dioxide, hydrogen, hydrocarbon and the like.

Known examples of a process for separating and recovering an objective gas from a mixed gas may include a cryogenic distillation process, a pressure swing adsorption process (PSA), a membrane separation process and a combination of these processes. For example, in the case of preparing oxygen and nitrogen as a product using air as a raw material by the cryogenic distillation process, pressurized air is cooled to about $-190°$ C. by heat exchange and introduced into a distillation column, and oxygen and nitrogen are separated by conducting fractionating in the distillation column and taken out. The cryogenic distillation process has advantages of easily preparing gases having high purity and preparing large amounts of gases at a low cost.

In the meantime, in the case of preparing oxygen as a product using air as a raw material using the PSA process, air is passed through, under pressure, using zeolite as an adsorbent and thereby nitrogen, which is an easily adsorbing component, is adsorbed and fixed to the adsorbent, so that oxygen, which is a hardly adsorbing component, is taken out from the adsorbent layer. When the nitrogen-adsorbed adsorbent is placed in sufficiently low pressure conditions from the air-passing step, nitrogen is desorbed from the adsorbent and thereby can be in a reusable state. The PSA procedure of repeating the adsorption procedure under relatively high pressure and the regeneration procedure under relatively low pressure has advantages such that the amount of products generated per adsorbent is easily enhanced and the apparatus thereof can be made compact because adsorption and regeneration can be changed for a short time.

The membrane separation process is a process of passing air as a raw material to a polymer resin membrane having high affinity to oxygen, or to the inside of a membrane having a physical pore diameter smaller than nitrogen, and collecting oxygen selectively effused outside the membrane. This process has an advantage such that the apparatus is compact and is not expensive although oxygen having high purity cannot be obtained.

In the process for preparing semiconductor products, before a substrate for treatment is introduced into the inside of a chamber, the chamber inside is made to be in a clean nitrogen atmosphere by, for example, vacuum pumping while passing nitrogen gas through the chamber. Thereafter, the substrate is passed into the treatment chamber. In this event, passing of nitrogen gas and vacuum pumping are continuously carried out for keeping the clean nitrogen atmosphere. Therefore, most of the gas discharged before and during the substrate passage is nitrogen gas.

Thereafter, the passing gas is changed from nitrogen gas to a rare gas (krypton or xenon) and thereby the inside of the treatment chamber becomes a rare gas atmosphere and then treatment is carried out by generating plasma with high frequency electric discharge or the like. That is, when the plasma treatment is carried out, most of the components of the gas discharged from the treatment chamber are rare gases. After high frequency application is stopped to stop plasma and the passing gas is changed into nitrogen, the substrate is taken out. Most of the gas discharged during the time between the plasma stoppage and taking out of the substrate becomes nitrogen gas.

Furthermore, between the treatment chamber and the vacuum pumping system, nitrogen gas is passed through at all times in order to prevent reverse diffusion of impurities generated from the vacuum pumping system. This nitrogen gas is discharged together with the gas discharged from the treatment chamber. Further, in order to prevent air from involving a bearing portion of a vacuum pump, nitrogen gas is passed to the bearing portion and a part of the nitrogen gas passed enters into a vacuum pumping system and is exhausted.

As described above, when the substrate is carried in the treatment chamber and carried out from it, and the treatment chamber is in the stand-by operation, most components of the gas exhausted are, for example, inert gases such as nitrogen, argon and the like, while the components of exhausted gas in the plasma treatment contain nitrogen or argon, and a rare gas. Here, the gas pressure at each exhausting time is atmospheric pressure.

Accordingly, even if plasma treatment is completed in the treatment chamber and then nitrogen gas or argon is passed through, the amount of the rare gas in exhausted gas is not rapidly decreased. That is, the rare gas concentration in the exhaust gas is always varied, and there is a time lag between the atmosphere in the treatment chamber and the exhaust gas components. Further, into the exhaust gas, a gas for preventing the vacuum pump from involving of the atmosphere, a gas for preventing reverse diffusion and a gas for preventing sedimentation will be added so that the rare gas concentration is decreased by one order of magnitude or more as compared with the gas concentration fed into the treatment chamber.

Exhaust gas containing a rare gas, which is a subject for recovering, separating and purifying, mainly comprises a rare gas, and nitrogen or argon, and in plasma oxidation, exhaust gas further contains several % of oxygen in addition to them. Further, in plasma CVD, exhaust gas further contains a metal hydride type gas and in reactive ion etching, exhaust gas further contains a halogenated hydrocarbon type gas. Furthermore, exhaust gas may contain slight amounts of impurities and, as a reaction by-product, moisture, carbon monoxide, carbon dioxide, hydrogen, hydrocarbon and the like. Therefore, it is necessary to previously exclude gas components which deteriorate the adsorption properties of activated carbon from the above gas components.

When exhaust gas is recovered in a gas container, as described above, the exhaust gas amount is very large as compared with the amount of the gas introduced into a treatment chamber and thereby the volume of the gas-recovering container is huge. For example, if exhaust gas is assumed to be recovered into a 47 L container with a pressure of 0.1 MPa, even if the gas for preventing sedimentation is not added, the exhaust gas amount corresponding to only about 100 substrates treated can be recovered. In this recovering, the rare gas amount recovered in the recovery container is about 100 L.

On this account, the recovery container needs to be changed frequently and consequently, the increase of the distribution cost of the recovery container will be caused. Further, there is a problem such that the control of a rare gas separation and purifying apparatus will be difficult because the rare gas concentration varies and the rare gas concentration is different in each of recovery containers. Therefore, it is necessary to introduce exhaust gas into the separation and purifying apparatus and to operate the separation and purifying apparatus while measuring a rare gas in a low concentration contained in each recovery container, or it is necessary to separate and purify a rare gas using a purifying apparatus having sufficient redundancy. Consequently, the cost for measuring is added or the size of the separation and purifying apparatus is enlarged.

The plasma treatment time varies depending on semiconductor products. For example, in the case of plasma oxidation treatment by adding several % of oxygen gas to a rare gas, the treating time is determined between from 1 minute to 5 minutes according to the thickness of an oxidation film to be formed. Additionally, the oxidation film thickness varies each several substrates or several ten substrates with the result that the maximum rare gas concentration in the exhaust gas and the time vastly varies each several ten minutes to several ten hours.

As a process for recovering rare gas-containing gas exhausted from rare gas use equipment for producing semiconductor products and separating and purifying the rare gas, proposed are a process for efficiently separating and purifying a rare gas by separating the rare gas and impurities by a process using at least two separation means including membrane separation and adsorption separation and an apparatus used in the process (for example, disclosed in Japanese Unexamined Patent Publication No. 2002-97007).

With regard to the rare gas recovery and purifying apparatus, the above patent literature proposes a device for separating and purifying an objective rare gas from an exhaust gas in which flow rate and rare gas concentration successively vary. Particularly, in the case where flow rate variation or concentration variation, which is not assumed in designing and manufacturing, occurs, the above rare gas recovery and purifying apparatus has a possibility of unstable operation conditions.

Furthermore, because the rare gas recovery and purifying apparatus is designed in the use conditions of an equipment using a rare gas, when the equipment using the rare gas is changed, it is difficult to employ the apparatus as it is, and the apparatus has a problem of lacking in redundancy.

Under the circumstances, it is an object of the invention to provide a process for recovering a rare gas using a gas-recovering container capable of stably recovering rare gas-containing exhaust gas even if the flow rate of exhaust gas or the rare gas concentration in exhaust gas varies, in recovering a rare gas from exhaust gas containing a rare gas, which is a high value gas such as krypton or xenon and used as an atmosphere gas for apparatuses of producing semiconductor products, and then separating and purifying the rare gas.

SUMMARY OF THE INVENTION

The process for recovering a rare gas by the use of a gas-recovering container according to the present invention comprises the steps of recovering a rare gas in a rare gas-containing exhaust gas discharged from an equipment using the rare gas, introducing the recovered rare gas containing exhaust gas to rare gas separating and purifying equipment and thereby separating and purifying the rare gas, wherein the former step of recovering a rare gas-containing exhaust gas discharged from the equipment using said rare gas comprises, in the order mentioned, the step of:

removing one or more interfering gases (harmful components) contained in said exhaust gas;

introducing, with pressure, the resulting exhaust gas into an air-tight gas-recovering container containing activated carbon which adsorbs the rare gas, the gas-recovering container having a joint section connectable to a gas duct through an on-off valve, thereby recovering, in the gas-recovering container, the rare gas-containing exhaust gas; and introducing the thus recovered rare gas-containing exhaust gas into an equipment for purifying the rare gas by decreasing pressure in the gas-recovering container.

the one or more interfering gases is(are) at least one selected from the group consisting of fluorine compounds, fluoride gases, carbon dioxide, hydride gases and nitrogen oxide gases.

According to the process for recovering a rare gas by the present invention, it is possible to carry out separating and purifying treatment by introducing rare gas-containing exhaust gas in a stable state to the rare gas separation and purifying equipment even if the total amount or the rare gas concentration of rare gas-containing exhaust gas discharged from an equipment using a rare gas. Further, the process can treat rare gas containing exhaust gases discharged from a plurality of equipment using the rare gas inclusively, so that the treatment efficiency of the rare gas separation and purifying equipment can be improved. Particularly, one or more interfering gases contained in rare gas-containing exhaust gas are removed and introduced into the gas-recovering container, so that rare gas-containing exhaust gases having various compositions exhausted from the equipments using the rare gas, which conduct various processes can be recovered by one gas-recovering container, and further, activated carbon present therein can be used in a stable state for a long time.

DETAILED DESCRIPTION OF AN EXEMPLARY EMBODIMENT

Hereinafter, one embodiment of the process for recovering a rare gas using the gas-recovering container according to the present invention will be described.

Figure 1:
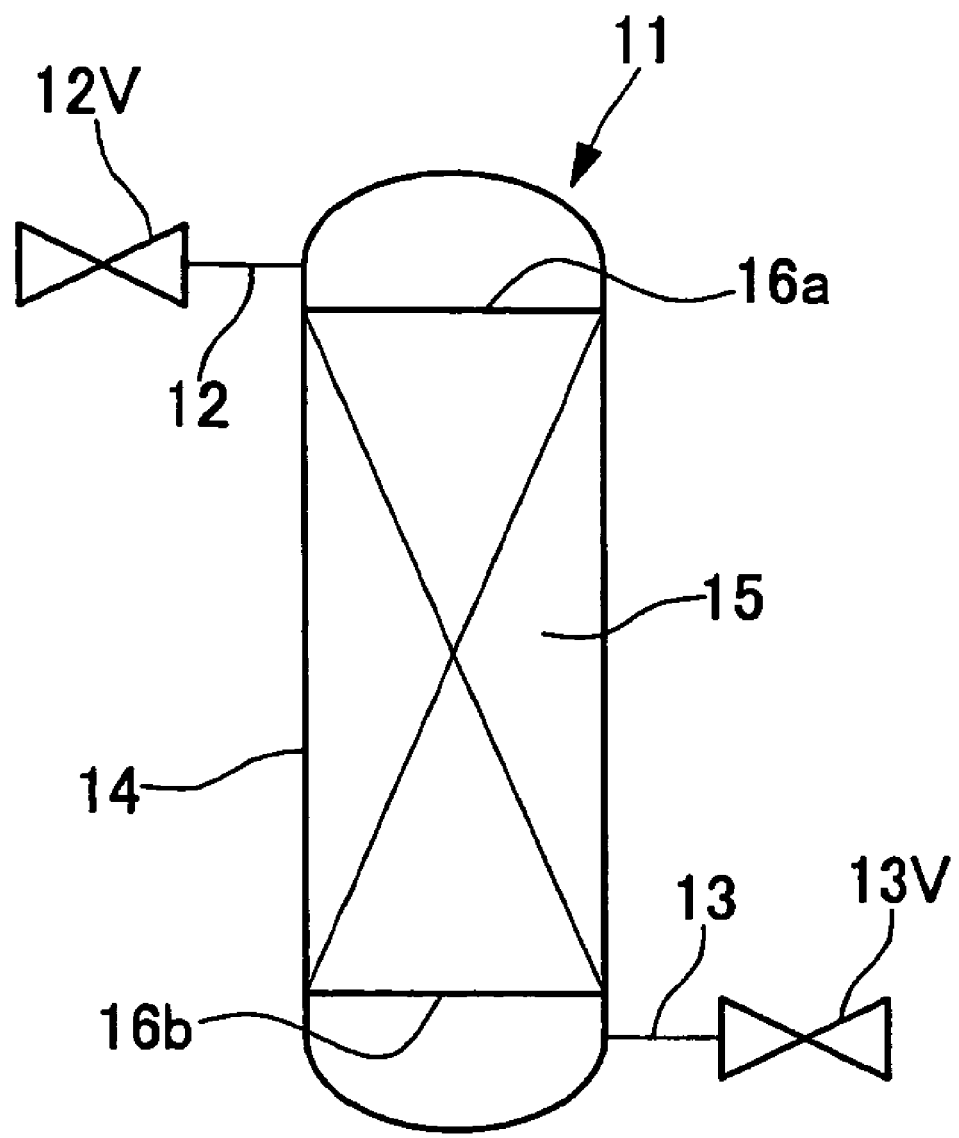
FIG. 1 is an illustrative view showing one embodiment of a gas-recovering container for use in the present invention.

FIG. 1 is an illustrative view showing one embodiment of a gas-recovering container used in the present invention. The gas-recovering container 11 comprises a cylindrical air-tight container 14, having at both ends, joint sections 12, 13 capable of connecting outer gas ducts through on-off valves 12V, 13V and containing, therein, activated carbon 15 capable of adsorbing krypton and xenon (hereinafter referred to as rare gases). The activated carbon 15 comprises micropores of a porous substance having a pore diameter of at least 0.4 nm and is filled in the space between filters 16a, 16b disposed in both ends of the inside of the air-tight container 14.

The amount of the activated carbon can arbitrarily be set in accordance with the conditions of the gas-recovering container 11, such as shape, volume or the like. For example, a gas-recovering container 11 having a volume of 40 L can be filled with about 20 Kg of the activated carbon and in the gas-recovering container, the amount of xenon adsorbed on the activated carbon is about 1100 L at atmospheric pressure.

The joint sections 12, 13 are formed so that the joint sections 12, 13 are connected to the spaces of the container ends apart from the filter 16a, 16b, and the entire amount of a gas flowing in the gas-recovering container 11 from one joint section 12 flows out from the other joint section 13 through the filling layer of the activated carbon 15. The gas-recovering container has an advantage such that passing purge can be carried out in the container by providing the joint sections 12, 13 on both ends of the container, and further a gas-recovering container having only one joint section can be also used.

Immediately after filling the activated carbon 15 in the gas-recovering container 11 thus formed, nitrogen, oxygen, carbon dioxide, moisture and the like, which are atmospheric components, are present in the container 14 and the inside of the activated carbon 15. Therefore, any one of the joint sections 12 and 13 is connected to a vacuum pumping apparatus, the container is vacuum pumped and thereby the atmospheric components are removed from the container inside. In this removal, the vacuum pumping pressure is preferably set to not more than 100 Pa. The removal of the atmospheric components in the gas-recovering container 11 is not limited to the above process with vacuum pumping.

For example, vacuum pumping is carried out from one of the joint sections 12, 13 and simultaneously the other of the joint sections 12, 13 is connected to a gas feeding apparatus such as a gas cylinder or the like and passing purge is carried out by introducing a gas having a low adsorption amount to the activated carbon 15 per unit weight, such as nitrogen, oxygen, hydrogen, helium and the like, and further together with these procedures, the gas-recovering container 11 is heated, and thus the exhaust of the atmospheric components from the gas-recovering container 11 can be effectively carried out. In this exhaust, after completion of the passing purge or heating purge, it is preferred to carry out vacuum pumping in order to set the final inside pressure of the gas recovering container 11 to not more than 100 Pa.

Heating of the gas-recovering container 11 may be carried out by externally heating with a heater or the like provided outside the container, and further may be carried out during the vacuum pumping or during the passing purge. At this time, the heating temperature is preferably in the range of from 100 to 500° C., more preferably in the range of from 200 to 300° C. When the container is heated to 300° C., the pressure in the container is desirably not more than 100 Pa.

In the recovering rare gas-containing exhaust gas, it is possible to recover the rare gas very efficiently by using the gas-recovering container 11 filled with the activated carbon 15. The activated carbon 15 from which the atmospheric components are removed by carrying out the above purge procedure can adsorb large amounts of gases. The adsorption amount differs depending on the physical properties of a gas. Particularly, the absorption amount of a gas having a high molecular weight, such as xenon, krypton or the like, or carbon dioxide or the like is larger than that of oxygen, nitrogen or argon.

Accordingly, even if exhaust gas has a low concentration of a rare gas such as xenon or the like, the rare gas contained therein is easily adsorbed on the activated carbon. Particularly, in the case of a mixed gas of xenon and nitrogen or the like, nitrogen hardly adsorbs to the site where xenon is adsorbed, and even in the site where nitrogen or argon is adsorbed, xenon adsorbs by replacing nitrogen because xenon has a large adsorption force.

Furthermore, utilizing the fact that a rare gas such as xenon or the like more easily adsorbs, as compared with nitrogen, argon or the like, it is possible to concentrate a rare gas in the gas-recovering container. For example, while exhaust gas is introduced into the gas-recovering container 11 from the side of one on-off valve 12V, the other on-off valve 13V is opened after the inside pressure of the gas-recovering container 11 reaches atmospheric pressure or higher, and thereby a part of the gas is discharged from the gas-recovering container 11. More specifically, in the case where the xenon concentration of exhaust gas is about 0.1%, the amount of the gas discharged from the on-off valve 13V is set to be about one-tenth of the amount of the exhaust gas introduced from the on-off valve 12V. The amount of the gas exhausted from the on-off valve 13V may be, preferably, from about 1/10 to 1/30 although depending on the kind and the concentration of a rare gas in the exhaust gas introduced.

As described above, even if exhaust gas discharged from the equipment using the rare gas has a low rare gas concentration, using the gas-recovering container 11 filled with the activated carbon 15, the rare gas can efficiently be recovered and stored in the gas-recovering container 11 and thereby it is possible to store the rare gas in an amount about ten times greater than the amount stored in a gas-recovering container compared with the case where activated carbon is not filled therein. Accordingly, if the volume of the gas-recovering container 11 is as the same as that of a conventional vessel, it is unnecessary to conduct container exchange frequently, and further because the gas-recovering container 11 may be smaller than conventional ones, it is possible to decrease the distribution cost thereof.

Further, utilizing selective adsorption of a rare gas to activated carbon even if the concentration of a rare gas in exhaust gas varies, the rare gas concentration in the gas-recovering container 11 can be kept approximately constant. Therefore, in introducing the rare gas containing gas recovered into a rare gas separation and purifying apparatus, it is unnecessary to measure the rare gas concentration and vain redundancy is unnecessary for the separation and purifying apparatus so that the use of the gas-recovering container 11 contributes to the downsizing of the separation and purifying apparatus and the cost reduction of separation and purifying.

Figure 2:
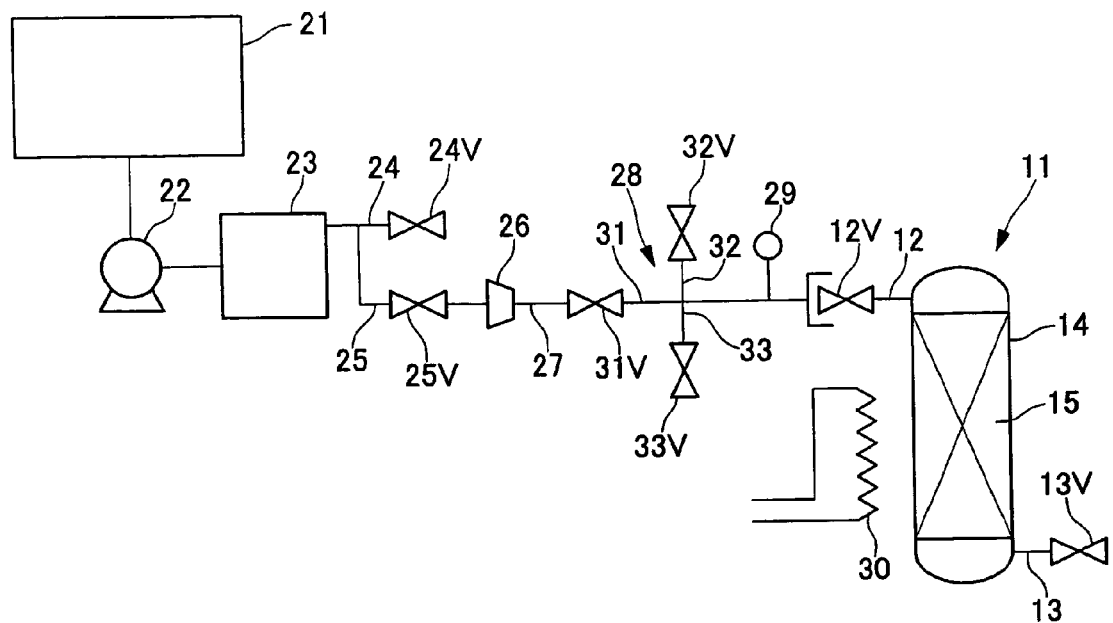
FIG. 2 is a system diagram showing one embodiment of a gas recovery apparatus for carrying out the present invention.

FIG. 2 is a system diagram showing one embodiment of a gas recovery apparatus suitable for the present invention in recovering rare gas-containing exhaust gas discharged from a reactive ion etching apparatus, which is an equipment using a rare gas, to the above gas-recovering container. In the following description, as the gas-recovering container, it is possible to use the same gas-recovering container as that shown in FIG. 1 so that the detailed description of the gas-recovering container is omitted using the same reference numerals as those in FIG. 1.

In the equipment using the rare gas 21, for example, the reactive ion etching apparatus is equipment for carrying out treatment of a substrate by generating plasma in a treatment chamber under reduced pressure, and the surface of the substrate disposed in the treatment chamber is treated by introducing a mixed gas of a fluorocarbon type gas (fluoride type gas) for etching and xenon which is a plasma generating gas or an inert gas such as argon or the like and further oxygen into the treatment chamber and applying high frequency, microwave or the like from the outside and thereby generating plasma in the treatment chamber. The plasma treatment is carried out by introducing the above gases into the treatment chamber under reduced pressure while the treatment chamber is vacuum pumped with a vacuum pumping apparatus 22. In order to prevent deposition of by-products in the vacuum pumping apparatus 22, a purge gas may be introduced into the vacuum pumping apparatus 22.

In etching a silicon dioxide film, fluorocarbon type gas is dissociated and decomposed in plasma and reacted with the silicon dioxide film on the substrate surface. Accordingly, gases (exhaust gas) discharged from the vacuum pumping apparatus 22 include fluorocarbon type gas having a bad influence upon the adsorption properties of activated carbon 15, decomposed products thereof, for example, $CF_4$, $C_2F_6$, $COF_2$ or the like, and carbon dioxide and $SiF_4$ generated by etching the silicon dioxide film.

Further, in a film forming process using a rare gas, a mixed gas of a metal hydride type gas for film forming and xenon, or a mixed gas of xenon and an inert gas such as argon or the like is introduced into a chamber and high frequency, microwave or the like is applied from the outside. Similar to the above etching process, the plasma generation is carried out under reduced pressure so that the chamber is vacuum pumped by the vacuum pumping apparatus 22 with introducing the gas. In the film forming process, the metal hydride type gas is dissociated and decomposed in plasma to form a film forming seed and then film growth to the substrate surface is performed. Therefore, gases discharged from the vacuum pumping apparatus 22 include the metal hydride type gas and degradation products thereof such as $H_2$.

In order to remove an unnecessary film deposited in the chamber, a cleaning gas is introduced. The cleaning gas essentially comprises a fluorocarbon type gas or a halide type gas. The gases discharged from the vacuum pumping apparatus 22 include fluorocarbon type gas and decomposed products thereof, and further halide type gas such as $NF_3$, $ClF_3$, or the like, and decomposed products thereof such as $Cl_2$, $HCl$, $F_2$, $HF$, $Cl_2$, $Br_2$, $HBr$ or the like, and gases generated by cleaning such as $SiF_4$, $SiCl_4$ or the like.

These gases are reacted with activated carbon or have a function such that they are deposited on the activated carbon surface to lose the function of the activated carbon. Further, there is $CO_2$ or another gas, which has a adsorption force higher than that of xenon and hinders the adsorption site of xenon or krypton to inhibit the adsorption of xenon or krypton to the activated carbon.

In a nitride film or oxynitride film forming process using a rare gas, a mixed gas of nitro-oxygen type gas for film forming such as ammonia, nitrogen dioxide, nitrogen oxide, nitrogen, or hydrogen and krypton or xenon for plasma generating gas, or a mixed gas of krypton, xenon and an inert gas such as argon or the like, and further oxygen are introduced into a treatment chamber, and high frequency, microwave or the like is applied from the outside. The plasma generation is carried out under reduced pressure, so that the treatment chamber is vacuum pumped by the vacuum pumping apparatus 22 while introducing the above gas.

In silicon nitriding, the above nitro-oxygen type gas is dissociated and decomposed in plasma and reacted with silicon. Therefore, the gases exhausted from the vacuum pumping apparatus 22 include a nitro-oxygen type gas, decomposed products thereof such as ammonia, dinitrogen monoxide, nitrogen dioxide, nitrogen oxide or the like and further hydrogen. Some of these gases with higher adsorption capability interfere with the adsorption of xenon or krypton to activated carbon.

The gas recovery apparatus for recovering rare gas-containing exhaust gas discharged from the equipment using the rare gas 21 through the vacuum pumping apparatus 22 into the above gas-recovering container 11 comprises harmful component removal means 23 for removing one or more interfering gases as described above, which lower the adsorption capability of the activated carbon 15 placed in the gas-recovering container 11, from exhaust gas; an exhaust gas discharge passage 24 for discharging the exhaust gas when a rare gas is absent in the exhaust gas; a rare gas-containing exhaust gas passage 25 for leading rare gas-containing exhaust gas when a rare gas is present in the exhaust gas; a compressor 26 for pressurizing the rare gas-containing exhaust gas after one or more interfering gases have been removed by the harmful component removal means 23; a gas recovery duct 27 for connecting the downstream side of the rare gas containing exhaust gas flowed after pressurizing to any one of joint sections 12, 13 of the gas-recovering container 11; purge means 28 for purging air components present in the gas recovery duct 27; a pressure gauge 29 for measuring the pressure of the inside of the gas recovery duct 27; and cooling means 30 for cooling the gas-recovering container 11. The purge means 28 is formed by combining three ducts 31, 32, 33 equipped with valves 31V, 32V, 33V, respectively. The first duct 31 comprises the downstream side of the gas recovery duct connecting from the above gas recovery duct 27 to any one of the joint sections 12, 13 of the gas-recovering container 11 through the valve 31V.

As the duct connecting the equipment using the rare gas 21, the vacuum pumping apparatus 22 and the harmful component removal means 23, it is desired to use a metal duct having a relatively large bore diameter in consideration of duct conductance, for example, a stainless steel duct having a bore diameter of about 50 mm. As the duct of the rare gas containing exhaust gas passage 25 connecting from the harmful component removal means 23 to the compressor 26 through the valve 25V, it is desired to use a duct having a bore diameter of about 12 mm. Furthermore, as each of the ducts after the compressor 26, it is desired to use a duct having as a small volume as possible. As described above, the bore diameter of each duct is selected in accordance with the partial pressure of a rare gas flowing in each duct and a duct having a small bore diameter is used for the ducts after the compressor in which the total pressure is higher than atmospheric pressure, and thereby the efficiency of recovering a rare gas can be enhanced by decreasing the amount of a rare gas remaining in the ducts.

Hereinafter, the procedure for recovering rare gas-containing exhaust gas in the gas-recovering container 11 using the gas recovery apparatus will be described. First, the gas-recovering container 11 is connected to the gas recovery apparatus. That is, the downstream end of the first duct 31 continued from the above gas recovery duct 27 is connected the joint section 12 which is one of the joint sections of the gas-recovering container 11. Usually, in this event, all of the valves are closed.

Next, atmospheric components present in the duct passage are purged. The procedure for purging the atmospheric components may be carried out by batch purge with repeating application of pressure and reducing pressure or aeration purge with passing an inert gas in the passage. In the batch purge, for example, the procedure for applying pressure while introducing an inert gas such as argon or nitrogen from the valve 32V and the procedure for reducing pressure in the passage while closing the valve 32V and opening the valve 33V are repeated. In the aeration purge, the procedure for exhausting from the valve 33V while introducing an inert gas from the valve 33V may be carried out. Furthermore, the duct 33 in the valve 33V side is connected to a vacuum pumping apparatus (not shown) and the inside of the passage enclosed with valves 12V, 31V, 32V and 33V may be pumped. Further, the purge treatment may be carried out by combining these procedures. The gas-recovering container 11 is connected in the above manner and atmospheric components are purged from the inside of the passage for recovery, and thereafter the procedure of recovering rare gas contained in an exhaust gas is started.

Exhaust gas in the rare gas use equipment 21 is discharged through the above vacuum pumping apparatus 22 and then is introduced in the harmful component removal means 23 and, therein, one or more interfering gases in the exhaust gas, that is, fluorine compounds, fluoride type gas, carbon dioxide, hydride type gas and nitrogen oxide type gas are removed. In the case where the harmful component removal means 23 is connected in the downstream side of the vacuum pumping apparatus 22, harmful component removal means capable of not only removing one or more interfering gases which lower adsorption capability of activated carbon 15 but also capable of removing one or more interfering gases, which cannot be liberated as they are in the atmosphere, is used.

Preferable examples of such harmful component removal means may include a catalyst decomposition method, a plasma decomposition method and an adsorption method. Any one of them may be used depending on the components of exhaust gas and the concentration thereof by selecting the optimum method properly, and further, a plurality of the harmful component removal means can be used in combination properly. In contrast, in the case where a harm removal apparatus has been already set in the equipment using the rare gas 21, this apparatus for harm removal is detached and may be changed with the harmful component removal means 23 or the harmful component removal means 23 may newly be set in the downstream side of the harm removal apparatus. In the case where the harmful component removal means 23 is set in the downstream side of the apparatus for harm removal, the exhaust gas discharge passage 24 can be set in the upstream side of the harmful component removal means 23.

Examples of the gas for reacting with activated carbon may include halides such as $F_2$, HF, $Cl_2$, HCl, $Br_2$, HBr, HI, $SiF_4$, $SiCl_4$, $NF_3$, $ClF_3$ or the like. Examples of the gas for losing the function of activated carbon by deposition may include metal hydrides such as $SiH_4$, $Si_2H_6$, $GeH_4$, $AsH_3$, $PH_3$, $B_2H_6$, $SeH_2$ or the like, and metal halides such as $BF_3$, $BCl_3$, $WF_6$, $PF_3$, $AsF_3$, $PCl_3$ or the like. Examples of the gas for inhibiting the adsorption site of xenon or krypton may include $CO_2$, perfluorocarbons such as $COF_2$, $C_2F_6$, $C_2F_4$, $C_2F_2$, $C_3F_6$ or the like, and further $NH_3$, NO, $NO_2$, or the like.

In the harmful component removal means 23 for removing one or more interfering gases, a catalyst thermal decomposition method may be employed for the above fluoride type gases and metal fluoride gases. The catalyst thermal decomposition method comprises the steps of heating a catalyst containing a noble metal such as Pt, Pd or the like to about 800° C., allowing the above gas to contact with the heated catalyst and thereby decomposing a gas, which does not generally decompose at about 400° C., such as $CF_4$, $C_2F_6$ or the like. In order to accelerate the decomposition, the gas is actively converted to $COF_2$ or the like with introducing oxygen simultaneously. Thereafter, the gas is allowed to react with copper oxide and an alumina agent, and a reaction agent, such as calcium hydroxide, or oxide to remove fluoride type gas and metal fluoride type gas. HF or $F_2$ is removed by reacting with the above reaction agent without passing through a catalyst. Furthermore, a plasma decomposition method may be also employed. The plasma decomposition method comprises the steps of passing a gas to be processed under reduced pressure in such a condition of introducing oxygen in ICP plasma, generating CF ions, and CF radicals and reacting with Ca oxide or hydroxide to remove fluoride type gas and metal fluoride type gas.

$NF_3$ can be removed by reacting and decomposing $NF_3$ on Si with heating Si ingot, generating $SiF_4$ and $N_2$ and removing $SiF_4$ with copper oxide and an alumina agent.

Metal hydrides and metal halides can be removed by reacting with a remover comprised of copper oxide and an alumina agent. Ammonia and nitrogen oxides may be selectively removed by decomposing them on a Pt catalyst heated into $N_2$ and $H_2O$, and then treating ammonia and $H_2O$ with TSA using zeolite as an adsorbent.

When the gas treated with the harmful component removal means 23 contains no rare gas, the valve 25V of the rare gas containing exhaust gas passage 25 is closed, the valve 24V of the exhaust gas discharge passage 24 is opened and then the gas treated with the harmful component removal means 23 is discharged into the outside. When the treated gas contains a rare gas, the valve 24V of the exhaust gas-discharge passage 24 is closed, the valve 25V of the rare gas containing exhaust gas passage 25 is opened, and then the treated gas (rare gas-containing exhaust gas) is passed through toward the compressor 26.

In the compressor 26, rare gas-containing exhaust gas is pressurized to a prescribed pressure, for example, a pressure of about 0.8 MPa. The rare gas-containing exhaust gas pressurized flows in the gas recovery ducts 27, 31 through the valve 31V by opening the valve 31V and valve 12V, passes through the valve 12V of the joint section 12 and is then introduced into the gas-recovering container 11. In the former stage or subsequent stage of the compressor 26, a buffer tank can be provided.

For example, providing a buffer tank in the former stage of the compressor 26, the processing gas can be stably pressurized to a prescribed pressure even if the amount of the processing gas discharged from the harmful component removal means 23 varies. For the above compressor 26, a diaphragm type compressor is preferably used but the type of the compressor is not limited to the diaphragm type one, and it is sufficient to use a compressor having high air tight properties such that atmospheric components are not mixed into the processing gas.

The inside temperature of the gas-recovering container 11 is increased by flowing rare gas-containing exhaust gas therein, this temperature increase varies the amount of adsorption gas per unit weight of activated carbon 15. Accordingly, for example, the gas-recovering container 11 is cooled to a constant temperature, desirably not higher than 25° C. with cooling water by operating the above cooling means 30 and thereby a rare gas can be effectively adsorbed on the activated carbon 15.

The temperature increase within the gas-recovering container 11 caused by inflow of rare gas-containing exhaust gas depends on the gas inflow amount. For example, rare gas-containing exhaust gas is introduced at a rate of 40 L per minute into the gas-recovering container 11, and thereby the temperature of the adsorbent is elevated by about 1° C. per minute. In accordance with the temperature elevation, the temperature of the activated carbon 15 is elevated by 1° C. and thereby the amount of rare gas adsorbed is decreased by about 15%. In this procedure, the gas is introduced while cooling and maintaining the gas-recovering container 11 into not higher than 25° C. so that the decrease of the adsorption gas amount per unit weight can be prevented.

Furthermore, in introducing rare-gas containing exhaust gas to the gas-recovering container 11, while the pressure is measured by the pressure gauge 29, rare gas-containing exhaust gas is introduced to the gas-recovering container 11 with holding the pressure increase rate constant and thereby it is possible to keep the temperature of the gas-recovering container 11 more easily by means of the cooling means 30, it is also possible to keep the temperature constant without introducing an excess amount of cooling water into the cooling means 30 and wasteful energy can be reduced.

Because most of the gas introduced is adsorbed on activated carbon 15 at the beginning of introducing rare gas-containing exhaust gas into the gas-recovering container 11, the pressure measured by the pressure gauge 29 is not higher than atmospheric pressure, but the pressure is gradually increased by continuing the gas introduction. When the amount of the gas adsorbed on activated carbon is saturated, the pressure measured by the pressure gauge 29 becomes the same pressure as the discharge pressure of the compressor 26, for example, 0.8 MPa so that the completion of gas recovery, namely, the condition that a predetermined amount of rare gas-containing exhaust gas is filled with pressure in the gas-recovering container 11, can be easily judged. In accordance with this procedure, the rare gas amount depending on the rare gas concentration can be recovered in the gas-recovering container 11.

It is further possible to increase the recovery amount by concentrating a rare gas in the gas-recovering container 11. That is, at the beginning of introducing rare gas-containing exhaust gas, the procedure is the same as the procedure described above, but after the pressure of the gas-recovering container 11 becomes not less than atmospheric pressure, the valve 13, which is not connected to the gas recovery duct 27, is properly opened and then a part of the gas present in the gas-recovering container 11 is discharged outside from the joint section 13. In this event, it is possible to control the flow rate of the gas discharged from the gas-recovering container 11 by connecting the joint section 13 with the gas flow rate control apparatus, for example, connecting a flowmeter to a needle valve.

The flow rate of the gas discharged from the gas-recovering container 11 differs depending to the kind and concentration of a rare gas contained in rare gas-containing exhaust gas introduced in the gas-recovering container 11. When the rare gas is xenon and the concentration thereof is from 5 to 30%, the flow rate of the gas derived is preferably from 1/30 to 1/5 as much as the flow rate of the gas introduced. In this method, because hard adsorption components, which hardly adsorb on activated carbon 15 as compared with xenon, are selectively discharged outside from the gas-recovering container 11, it is possible to enhance the concentration of xenon for recovery in the gas-recovering container 11. Finally, when the pressure in the gas-recovering container 11 becomes the same as the discharge pressure of the compressor 26, the procedure is completed. In the case where a rare gas is krypton, the above procedure can be employed almost similarly.

It should be noted that when the equipment using the rare gas 21 is a reactive ion etching apparatus, the harmful component removal means 23 particularly removes fluoride type gases, and further, for example, even when the equipment using the rare gas 21 is a nitride film forming apparatus or oxynitride film forming apparatus, it is also possible to recover rare gas-containing exhaust gas in the gas-recovering container 11 only by changing the harmful component removal means 23 in the same procedure. That is, the harmful component removal means 23 may be selected in accordance with the exhaust gas components discharged from the equipment using the rare gas 21 and it is enough to remove, from exhaust gas, one or more interfering gases of lowering the adsorption capability of activated carbon 15, such as fluoride compounds, fluoride type gases, carbon dioxide, hydride type gases or nitrogen oxide type gases.

Figure 3:
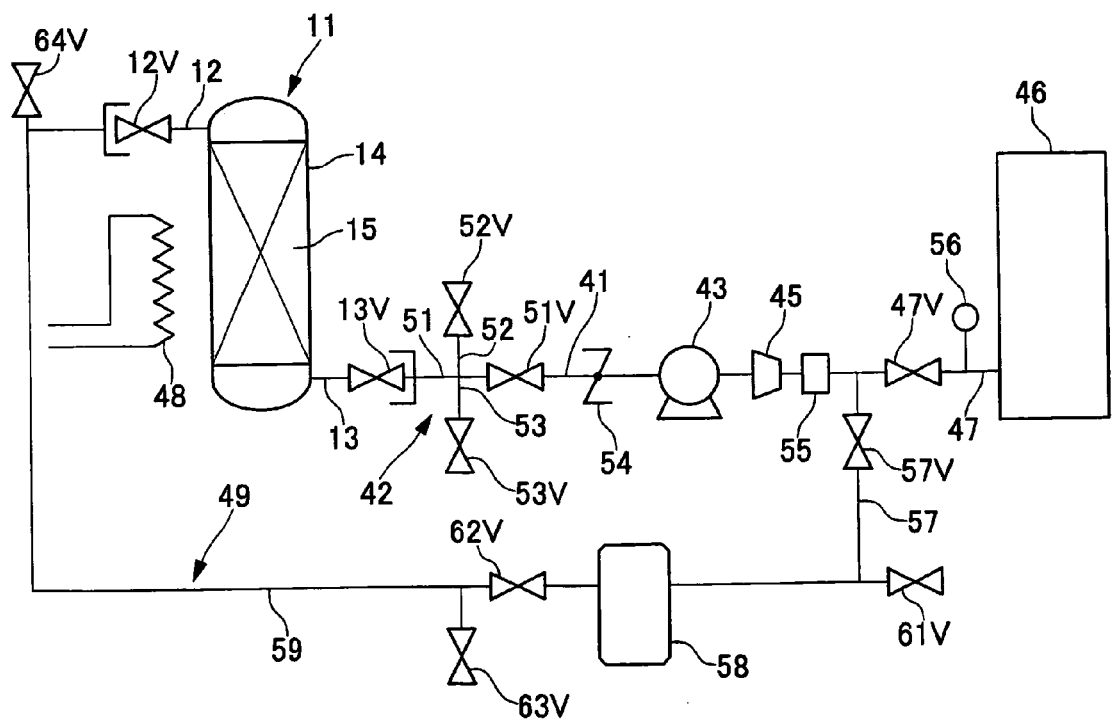
FIG. 3 is a system diagram showing one embodiment of a gas leading apparatus for carrying out the present invention.

FIG. 3 is a system diagram showing one embodiment of a gas discharge apparatus preferably used in introducing rare gas-containing exhaust gas recovered in the gas-recovering container 11 into the rare gas separation and purifying equipment and then separating and purifying the rare gas according to the present invention.

The gas discharge apparatus is equipped with a gas recovery duct 41 connecting to any one of the joint sections 12, 13 of the above gas-recovering container 11, a purge means 42 for purging the atmosphere components present in the gas recovery duct 41, a vacuum pumping apparatus 43, which is gas discharge means, for discharging the rare gas-containing exhaust gas present within the gas-recovering container 11 to the above gas recovery duct 41, a gas introducing passage 47 for pressurizing the rare gas-containing exhaust gas discharged by the vacuum pumping apparatus 43 to a prescribed pressure with a compressor 45 and introducing it to a rare gas separation and purifying equipment 46, heating means 48 for heating the gas-recovering container 11 and a gas circulation passage 49 for circulating and introducing the gas induced from one of the joint sections 12, 13 of the gas-recovering container 11 into the other of the joints parts 12, 13 of the gas-recovering container 11.

The purge means 42 is formed by combining three ducts 51, 52, 53 equipped with valves 51V, 52V, 53V, respectively. The first duct 51 is connected to any one of the joint sections 12, 13 of the above gas-recovering container 11 and constitutes a part of the above gas recovery duct 41. The gas recovery duct 41 is equipped with a conductance regulation valve 54 and a rare gas concentration measuring apparatus 54, as necessary, and the gas-introducing passage 47 is equipped with a pressure gauge 56.

The gas circulation passage 49 connects the gas-introducing passage 47 to any one of the joint sections 12, 13 of the gas-recovering container 11, and during the passage or in the branch of each passage, provided are a duct 57 branched from the upper of a valve 47V of the gas-introducing passage 47, a duct 59 for connecting to the duct 57 through a storage tank 58, a valve 57, provided in the duct 57, for circulating a gas to the gas circulation passage 48 and valves 61V, 62V, 63V, 64V used for purging the inside of the gas circulation passage 49 or introducing an inert gas in order to press out the gas present inside the gas-recovering container 11.

For the rare gas separation and purifying equipment 46, any one of a cryogenic distillation process, an adsorption separation method and a membrane separation method can be selected in accordance with the conditions such as its processing amount or the like and further equipment prepared by combining these methods can be also used. The heating means 48 may be means capable of heating the gas-recovering container 11 from the outside thereof, and as the heating means, it is possible to use a heater or the like capable of heating the gas-recovering container 11 to from 100 to 500° C., preferably 200 to 300° C. The rare gas concentration measuring apparatus 55 may be one capable of measuring the rare gas present in the gas with a precision of 1% and any measuring method can be employed. Further, it is preferred to employ a measuring apparatus utilizing a heat conduction measuring method, a mass spectrographic method or the like.

In order to lead out the rare gas-containing exhaust gas recovered in the gas-recovering container 11, at first, all of the valves are closed and then the duct 51 of the gas recovery duct 41 is connected to one joint section 13 of the gas-recovering container 11. Further, the duct 59 of the gas circulation passage 49 is connected to the other joint section 12. Successively, the atmospheric components present inside the duct 51 are purged. This purge procedure of the atmospheric components may be carried out by a batch purge with repeating pressure and reduce pressure or aeration purge with passing an inert gas into the passage.

The batch purge may be carried out by repeating a procedure of pressuring the inside of the passage with introducing an inert gas, for example, argon or nitrogen from the valve 52V and a procedure of reducing the pressure of the inside of the passage with closing the valve 52V and opening the valve 53V. The aeration purge may be carried out with a procedure of exhausting from the valve 53V while introducing an inert gas from the valve 52V. Furthermore, the duct 53 of the valve 53V side is connected to a vacuum pumping apparatus (not shown) and then the inside of the passage enclosed with valves 13V, 51V, 52V and 53V may be pumped. Further, the purge treatment may be carried out by properly combining these procedures.

After completion of the connection of the gas-recovering container 11 and the purge of the atmospheric components in the system, the valve 13V and the valve 51V are opened and thereby the rare gas-containing exhaust gas recovered in the gas-recovering container 11 is induced through the vacuum pumping apparatus 43, and then pressurized by the compressor 45. At this point, it is possible to keep the amount of the gas flowed from the gas-recovering container 11 to the vacuum pumping apparatus 43 constant by properly regulating the opening of the conductance regulation valve 54.

The gas-recovering container 11 is filled with rare gas-containing exhaust gas by application a pressure of, for example, 0.8 MPa so that just after the gas has been discharged from the gas-recovering container 11, a large amount of the gas flows out from the gas-recovering container 11 into the duct inside by the pressure difference with the duct inside. Meanwhile, when the pressure of the inside of the gas-recovering container 11 becomes atmospheric pressure or reduced pressure, the amount of the gas flowing out from the gas-recovering container 11 is decreased. That is, the amount of the gas flowed is largely changed by the time of flowing out the gas from the gas-recovering container 11.

In order to keep the gas flowing amount nearly constant, the opening of the conductance regulation valve 54 is regulated with the pressure measured by means of the pressure gauge 56. When the gas flowing amount can be regulated to be nearly constant, the vacuum pumping apparatus 43 and the compressor 45 can be operated in more stable conditions. Using a compressor capable of pressurizing the gas discharged from gas-recovering container 11 in a reduced condition to, for example, about 0.9 MPa as the compressor 45, the single compressor can be used as both the vacuum pumping apparatus 43 and the compressor 45.

The rare gas-containing exhaust gas pressurized by the compressor 45 is introduced into the rare gas separation and purifying equipment 46 while measuring the rare gas concentration by the rare gas concentration measurement apparatus 55. In this introduction, just after the discharge of the gas from the gas-recovering container 11 is started, the concentration of hard adsorption components, which hardly adsorb on activated carbon 15, such as argon, nitrogen, oxygen or the like, is higher as compared with that of a rare gas. Therefore, the concentration of the rare gas is desirably stabilized by providing a buffer tank (not shown) in the downstream side of the vacuum pumping apparatus 43.

When the rare gas concentration is low, the valve 47V of the gas introduction passage 47 is closed and the valve 57V of the duct 57 is opened, and thereby the gas discharged from the gas-recovering container 11 is introduced into the gas circulation passage 49 and further introduced into the storage tank 58 and therein stored temporarily. When the rare gas concentration of the gas discharged from the gas-recovering container 11 is higher than the definite concentration, the valve 57V is closed and the valve 47V is opened, and then the gas discharged from the gas-recovering container 11 is introduced into the rare gas separation and purifying equipment 46, to make the rare gas concentration of the gas to be introduced into the rare gas separation and purifying equipment 46 to higher than the definite concentration.

Then, when the inside pressure of the gas-recovering container 11 lowers with discharging the gas and the release of the rare gas adsorbed on activated carbon is started, the rare gas concentration in the gas discharged from the gas-recovering container 11 is increased. At this point, the valve 57V is opened, the gas present inside of the storage tank 58 is mixed with the gas led out from the gas-recovering container 11 and thereby introduced into the rare gas separation and purifying equipment 46 so that the rare gas concentration of the gas to be introduced into the rare gas separation and purifying equipment 46 can be stabilized.

Furthermore, in a condition such that a gas having a low rare gas concentration is stored in the storage tank 58, the valve 62V of the duct 59 and the valve 12V of the joint section 12 are opened and thereby the gas of the storage tank 58 is introduced with circulation into the gas-recovering container 11 so that utilizing the rare gas concentration difference between the activated carbon 15 and the activated carbon space, the rare gas adsorbed on the activated carbon 15 is efficiently released and thereby to be discharged from the gas-recovering container 11. In the case where the gas amount of the storage tank 58 is small, or the rare gas concentration of the gas of the storage tank 58 is higher than the prescribed concentration, an inert gas such as argon, nitrogen or the like may be separately introduced from the valves 63V, 64V.

In the meantime, when the rare gas-containing exhaust gas is led out from the gas-recovering container 11, the gas-recovering container 11 is heated to about 300° C. by the heating means 48 and thereby almost all the amount of the rare gas adsorbed on the activated carbon 15 is released and then led out from the gas-recovering container 11.

The completion of leading out the gas from the gas-recovering container 11 can be decided by the rare gas concentration measured by means of the rare gas concentration measurement apparatus 55 or the pressure of the gas-recovering container 11 measured by means of a pressure gauge provided separately. For example, when the rare gas concentration measured by means of the rare gas concentration measurement apparatus 55 is lower than the prescribed concentration and the pressure of the gas-recovering container 11 heated to 300° C. is 100 Pa or less, almost of the rare gas components recovered in the gas-recovering container 11 can be led out by completion of discharging the gas from the gas-recovering container 11.

As described above, using the gas-recovering container 11 with activated carbon 15 enclosed, it is possible to reuse a valuable rare gas efficiently in the following manner. The rare gas-containing exhaust gas discharged from the reactive ion etching apparatus or nitride film forming apparatus, the oxynitride film forming apparatus and the equipment using other rare gas 21 is recovered in the gas-recovering container 11 connected to the gas recovery apparatus fitted on the rare gas use equipment 21 and thereafter, this recovery container 11 is connected to the gas discharge apparatus fitted on the rare gas separation and purifying equipment, the rare gas-containing exhaust gas recovered in the gas-recovering container 11 is led out, introduced into the rare gas separation and purifying equipment, followed by separation and purifying in the rare gas separation and purifying equipment.

Further, in the case of carrying out rare gas separation and purifying by cryogenic distillation, because the boiling point of xenon or krypton differs by 30 to 85° C. as compared with that of nitrogen or argon, it is possible to separate the rare gas from the components other than the rare gas with slight energy and purify the rare gas. Further, in the cryogenic distillation, the rare gas separated and purified can be prepared in a liquid state so that after the separation and purifying, it is also possible to store a large amount of the rare gas by a smaller space.

In particular, the rare gas (xenon or krypton) present in rare gas-containing exhaust gas is adsorbed on activated carbon 15 capable of more easily adsorbing as compared with other exhaust gas components such as argon, nitrogen or the like and recovered, so that the rare gas concentration in the gas to be introduced into the rare gas separation and purifying equipment can be made to a high order of percentage of concentration. Therefore, xenon or krypton can be separated and purified very efficiently as compared with the case of separating and purifying xenon or krypton present in the atmosphere.

Furthermore, among exhaust gas discharged from the equipment using the rare gas 21, exhaust gas containing no rare gas is released to the outside so that the efficiency of recovering the rare gas can be improved. Moreover, before recovering rare gas-containing exhaust gas into the gas-recovering container 11, one or more interfering gases which lower the adsorption capability of activated carbon 15 are removed from exhaust gas by the harmful component removal means 23 so that the adsorption capability of the rare gas on the activated carbon 15 can be sufficiently exhibited and the design amount of xenon or krypton can be recovered with adsorption. Additionally, the gas-recovering container 11 can be repeatedly used for a long period of time so as to decrease the recovery cost of rare gas-containing exhaust gas.

Further, because the rare gas purified in the rare gas separation and purifying equipment is filled with high pressure in a gas container and submitted to use, the rare gas can be handled similar to generally distributed rare gases and can be used in various equipments using the rare gas.

Example 1

As shown in FIG. 1, the adsorption amount of xenon was measured using a gas-recovering container 11, which comprises an 8 L internal volume air-tight container 14 containing 4.0 Kg of activated carbon 15 therein. At first, in order to purge atmospheric components in the gas-recovering container 11, argon was introduced at a rate of 1 L/minute from one joint section 12 and simultaneously pumping was carried out from the other joint section 13 while heating at 300° C. by winding a heater on the circumference of the gas-recovering container 11. This condition was continued for 12 hours and thereafter, the valve 12 was closed to stop the argon introduction, and pumping was carried out until the pressure in the gas-recovering container 11 reached 100 Pa. Then, heating of the gas-recovering container 11 was stopped and it was cooled to 25° C.

Into this gas-recovering container 11, a mixed gas of 50% of xenon and 50% of argon was introduced and the total introduction amount and the pressure in the gas-recovering container 11 were measured. As a result, it was confirmed that when the mixed gas was introduced to the gas-recovering container 11 until the pressure reached 100 kPa, 226 L of xenon was adsorbed on the activated carbon 15.

Example 2

To a gas recovery apparatus as shown in FIG. 2, the gas-recovering container 11 was connected and the rare gas recovery amount was measured. The gas-recovering container 11 used was comprised of a 47 L internal volume air-tight container 14 containing 20 Kg of activated carbon 15 filled therein. The gas-recovering container 11 was subjected to a purge procedure in the same manner as in Example 1.

To an equipment using a rare gas 21, xenon was introduced at a flow rate of 1 L/minute to generate plasma and also pumping was carried out in a vacuum pumping apparatus 22. In this procedure, argon was introduced at a rate of 1 L/minute as a purge gas for the vacuum pumping apparatus 22 and argon was introduced at a rate of 0.5 L/minute as a purge gas for a harmful component removal means 23. Therefore, in a compressor 26, argon, pressurization was conducted using argon having a xenon proportion of 40% at a rate of 2.5 L/minute.

While the gas pressurized in the compressor 26 was introduced into the gas-recovering container 11 controlled at 25° C. by cooling means 30, the pressure change was watched by a pressure gauge 29. Consequently, for about two hours from the starting of gas introduction to the gas-recovering container 11, the pressure was lower than atmospheric pressure, but thereafter the pressure gradually increased and it reached 0.8 MPa by 2 hours and 50 minutes from the starting of gas introduction. It can be estimated that the xenon amount in the gas-recovering container 11 was 1250 L from the time and the flow rate of xenon.

In the case where the gas-recovering container 11 was not controlled to 25° C., the temperature was gradually elevated just after the staring of gas introduction to the gas-recovering container 11, and the temperature thereof elevated to about 35° C. by 1 hr and the pressure thereof became about atmospheric pressure. Furthermore, the pressure and temperature of the gas-recovering container 11 increased together, the pressure reached to 0.8 MPa by 13.5 hours and in this time, the temperature was 40° C. It can be estimated that the amount of xenon in the gas-recovering container 11 was 810 L from this time and the flow rate of xenon.

Example 3

To a gas discharge apparatus as shown in FIG. 3, the gas-recovering container 11, which recovered 1250 L of xenon in Example 2, was connected and the amount of xenon discharged was measured. As a vacuum pumping apparatus 43, which is gas discharge means, a vacuum pump having an pumping speed of 1000 m³/hour at 100 Pa was used and as a compressor 45, one capable of outputting a gas at a rate of 40 L/minute when the pressure was increased from atmospheric pressure to 0.8 MPa was used. As a rare gas concentration measurement apparatus 55, a thermo-conductivity method was used.

While the gas-recovering container 11 was heated at 300° C., the gas was led out from the gas-recovering container 11, and the xenon concentration of this gas was measured. As a result, xenon was not detected for 10 minutes after the starting of discharging the gas and the xenon concentration was about 20% after the passage of 10 minutes. Thereafter, the xenon concentration was increased to the maximum value of 52% and then gradually decreased to reach a definite value of about 41%.

Example 4

In Example 3, the gas led out from the gas-recovering container 11 for 20 minutes was stored in a storage tank 58 after the starting of discharging the gas. Thereafter, the gas led out from the gas-recovering container 11 was introduced into a rare gas separation and purifying equipment 46 and after the passage of 20 minutes, the gas stored in the storage tank 58 was introduced with circulation from a joint section 12 inverse to the gas discharge side of the gas-recovering container 11, through a gas circulation passage 49, and simultaneously argon was introduced at a rate of 20 L/minute into the gas circulation passage 49 from a valve 63V and then introduced into the gas-recovering container 11.

Based on the measurement value of the xenon concentration, introduction flow rate and time in the gas introduced into the rare gas separation and purifying equipment 46, the xenon amount introduced into the rare gas separation and purifying equipment 46 from the gas-recovering container 11 was calculated and then was found to about 1235 L. This shows the fact that 98.8% of xenon recovered by adsorbing on activated carbon 15 placed in the gas-recovering container 11 could be led out and introduced into the rare gas separation and purifying equipment 46.

When the gas was led out without heating the gas-recovering container 11, just after the starting of discharging the gas, the temperature lowered, and after the passage of 10 minutes from the initial temperature of 25° C., it lowered to 20° C. and after the passage of 20 minutes, it lowered to 13° C. Thereafter, the temperature was elevated by introducing the gas with circulation from the gas circulation passage 49 to the gas-recovering container 11 and reached an almost definite value of 22° C.

Based on the measurement value of the xenon concentration, introduction flow rate and time, the amount of xenon introduced into the rare gas separation and purifying equipment 46 from the gas-recovering container 11 was calculated and then was found to be about 1120 L. This shows the fact that 89.6% of xenon recovered by adsorbing on activated carbon 15 placed in the gas-recovering container 11 could be induced and introduced into the rare gas separation and purifying equipment 46.

We claim:

1. A process for recovering a rare gas in a rare gas-containing exhaust gas from an equipment using said rare gas, the process comprising the steps of:
   Step 1: removing one or more interfering gases contained in said exhaust gas;
   Step 2: introducing, with pressure, the resulting exhaust gas into an air-tight gas-recovering container containing activated carbon which adsorbs said rare gas, said gas-recovering container having a joint section connectable to a gas duct through an on-off valve, thereby recovering, in said gas-recovering container, the rare gas-containing exhaust gas; and
   Step 3: introducing the thus recovered rare gas-containing exhaust gas into an equipment for purifying said rare gas by decreasing pressure in said gas-recovering container;
   wherein Step 1 occurs before Step 2 or after Step 3, or both, and Step 1 occurs by a harmful component removal means for removing interfering gases contained in the exhaust gas; the harmful component removal means includes a catalyst decomposition method, a plasma decomposition method, and an adsorption method; and the harmful component means can be used singly or in combination.

2. The process according to claim 1, wherein the interfering gases are selected from a group consisting of halides, metal hydrides, metal halides, perfluorocarbons, $NH_3$ and hydride gases.

3. A process for recovering a rare gas in a rare gas-containing exhaust gas from an equipment using said rare gas, the process comprising the following steps:
   Step 1: removing one or more interfering gases contained in said exhaust gas, the interfering gases being selected from a group consisting of halides, metal hydrides, metal halides, perfluorocarbons, $NH_3$ and hydride gases;
   Step 2: introducing, with pressure, the resulting exhaust gas into an air-tight gas-recovering container containing activated carbon which adsorbs said rare gas, said gas-recovering container having a joint section connectable to a gas duct through an on-off valve, thereby recovering, in said gas-recovering container, the rare gas-containing exhaust gas; and
   Step 3: introducing the thus recovered rare gas-containing exhaust gas into an equipment for purifying said rare gas by decreasing pressure in said gas-recovering container;
   wherein Step 1 occurs before Step 2 or after Step 3, or both, and Step 1 occurs by a harmful component removal means for removing interfering gases contained in the exhaust gas.

* * * * *